US012725965B2

(12) United States Patent
Grudd

(10) Patent No.: US 12,725,965 B2
(45) Date of Patent: Sep. 1, 2026

(54) SEALING MODULE FOR CABLES OR PIPES, A TRANSIT SYSTEM COMPRISING SUCH A SEALING MODULE, AND METHODS OF MANUFACTURING SUCH A SEALING MODULE

(71) Applicant: Roxtec AB, Karlskrona (SE)

(72) Inventor: Mikael Grudd, Karlskrona (SE)

(73) Assignee: Roxtec AB, Karlskrona (SE)

(*) Notice: Subject to any disclaimer, the term of this patent is extended or adjusted under 35 U.S.C. 154(b) by 0 days.

(21) Appl. No.: 18/570,889

(22) PCT Filed: Jun. 28, 2022

(86) PCT No.: PCT/SE2022/050639

§ 371 (c)(1),
(2) Date: Dec. 15, 2023

(87) PCT Pub. No.: WO2023/277771

PCT Pub. Date: Jan. 5, 2023

(65) Prior Publication Data

US 2024/0322480 A1 Sep. 26, 2024

(30) Foreign Application Priority Data

Jun. 30, 2021 (SE) .................................... 2150845-2

(51) Int. Cl.
*H01R 13/52* (2006.01)
*F16L 5/08* (2006.01)
*H01R 4/64* (2006.01)

(52) U.S. Cl.
CPC ............ *H01R 13/5205* (2013.01); *F16L 5/08* (2013.01); *H01R 4/646* (2013.01)

(58) Field of Classification Search
CPC .................................................. H01R 13/5205
See application file for complete search history.

(56) References Cited

U.S. PATENT DOCUMENTS 3,612,744 A 10/1971 Thomas et al.
4,358,632 A * 11/1982 Buch ........................ H02G 3/22 174/360

(Continued)

FOREIGN PATENT DOCUMENTS

DE 3105182 A1 9/1982
EP 0948110 A1 10/1999

(Continued)

OTHER PUBLICATIONS

PCT International Search Report for PCT Application No. PCT/SE2022/050639 mailed on Sep. 27, 2022 (4 pages).

(Continued)

*Primary Examiner* — Hung V Ngo
(74) *Attorney, Agent, or Firm* — Merchant & Gould P.C.

(57) ABSTRACT

A sealing module for a cable or a pipe, comprising at least one compressible body and a conductor. The conductor is arranged to extend from the groove to the outer surface, such that the conductor electrically contacts the cable or pipe received in the groove and forms a conductive path to the outer surface. The conductor comprises a plurality of through apertures and conducting portions surrounding the apertures, wherein the apertures are arranged in longitudinal rows along the conductor, and wherein the apertures are displaced in the longitudinal direction in relation to the apertures of adjacent rows of apertures. Disclosed is also a transit system comprising one or more sealing modules. Methods of manufacturing the sealing module is also disclosed together with the use of an expanded metal mesh or a perforated metal sheet as a conductor in a sealing module.

14 Claims, 8 Drawing Sheets

(56) References Cited

U.S. PATENT DOCUMENTS 4,656,313 A * 4/1987 Moore ................. H05K 9/0018 174/362
4,677,253 A * 6/1987 Blomqvist ............... H02G 3/22 174/362
4,702,444 A * 10/1987 Beele ........................ F16L 5/14 174/151
4,733,016 A * 3/1988 Twist ........................ F16L 5/08 361/827
4,919,372 A * 4/1990 Twist ....................... H02G 3/22 248/68.1
5,493,068 A * 2/1996 Klein ....................... H02G 3/22 174/362
5,938,152 A * 8/1999 Kreutz ...................... F16L 5/08 277/630
5,939,676 A * 8/1999 Birmingham ............ H02G 3/22 439/466
6,890,191 B1 5/2005 Thorburn
8,598,472 B2 * 12/2013 Hildingsson ......... H02G 15/064 174/362
10,476,250 B2 * 11/2019 Coenegracht .......... H05K 5/069
11,280,433 B2 * 3/2022 Beele ........................ F16L 3/26
2005/0044915 A1 * 3/2005 Shimizu ................ F01N 3/2821 72/186
2012/0071029 A1 3/2012 Millevik
2017/0071063 A1 * 3/2017 Sizemore ............. H05K 9/0041
2019/0372328 A1 12/2019 Ehmann et al.
2020/0254502 A1 8/2020 Herbert et al.
2023/0034302 A1 2/2023 Grudd et al.

FOREIGN PATENT DOCUMENTS

GB 1258702 A 12/1971
JP 2019503865 A 2/2019
KR 20090114163 A 11/2009
WO 2012034988 A1 3/2012
WO 2018193420 A1 10/2018
WO 2021126047 A1 6/2021

OTHER PUBLICATIONS

Written Opinion of the International Searching Authority for PCT/SE2022/050639 mailed on Sep. 27, 2022 (8 pages).
Swedish Search Report mailed on Feb. 9, 2022 for Patent Application No. 2150845-2 (3 pages).

* cited by examiner

SEALING MODULE FOR CABLES OR PIPES, A TRANSIT SYSTEM COMPRISING SUCH A SEALING MODULE, AND METHODS OF MANUFACTURING SUCH A SEALING MODULE

This application is a National Stage Application of PCT/SE2022/050639, filed on 28 Jun. 2022, which claims the benefit of Serial No. 2150845-2, filed on 30 Jun. 2021, in Sweden, and which applications are hereby incorporated by reference in their entireties. To the extent appropriate, a claim of priority is made to each of the above disclosed applications.

TECHNICAL FIELD

The present invention concerns a sealing module. More specifically the present invention is related to a sealing module comprising at least one compressible body and a conductor, wherein the compressible body comprises an outer surface and a groove for receiving a cable or a pipe, and wherein the conductor is arranged to extend from the groove to the outer surface, such that the conductor electrically contacts the cable or pipe received in the groove and forms a conductive path to the outer surface. Sealing modules of this type are used for grounding of pipes, or cables provided with a shield, screen or armor. The present invention is also related to a transit system comprising one or several of such sealing modules. In addition, the present invention is related to methods of manufacturing such a sealing module.

BACKGROUND

Electrically shielded cables, or cables comprising a cable screen or shield made of an electrically conductive material, have several applications. The purpose of the screen may be to maintain the quality of the signal conducted through the shielded cable, or to screen the surroundings from electromagnetic interference (EMI) caused by the signal conducted through the cable, or vice versa. Cables may also be provided with an armor, a metallic enclosure surrounding the cable. The screen or shield serves its function continuously, preventing EMI from travelling into or out of the cable while the armor serves it purpose of preventing sudden failure, since it mechanically prevents the cable from being damaged, or prevents a more severe failure, since it is often used to bond the cable to ground (earth potential).

Such shielded or armored cables may be grounded as they pass a structure or is terminated, e.g. for the purposes of bonding the cable with the surroundings or to prevent radio frequency interference (RFI) from passing through a shielded structure, such as a shielded wall, enclosure or bulkhead.

The disclosure of the present application mainly relates to applications where a bond to ground is required and/or potentially high currents have to be diverted away, e.g. grounding in high-power applications, bonding and equipotential bonding and lightning protection. In general the present invention may be used in electrical installations where high current carrying capabilities are required. Examples of typical cables used are metal clad cables and TECK cables, and also wired armoured cables (e.g. SWA cables) and wired braid cables (e.g. SWB cables) i.e. high-performance cables with a metal casing, which cables may be used in hazardous environments.

There is a plurality of prior art solutions for grounding cables or pipes in a transit through a partition. One prior art solution is disclosed in WO2012/034988, which discloses a sealing module comprising at least one compressible body and a conductor for grounding a cable or pipe arranged in the sealing module.

SUMMARY

In view of the above one object of the present invention is to provide an improved sealing module with efficient grounding of pipes or cables.

The present invention is related to a sealing module comprising at least one compressible body and a conductor, wherein the compressible body comprises an outer surface and a groove for receiving a cable or a pipe, and wherein the conductor is arranged to extend from the groove and to the outer surface, such that the conductor electrically contacts the cable or pipe received in the groove and forms a conductive path to the outer surface, wherein the conductor comprises a plurality of through apertures and conducting portions surrounding the apertures, wherein the apertures are arranged in longitudinal rows along the conductor, and wherein the apertures are displaced in the longitudinal direction in relation to the apertures of adjacent rows of apertures. The conductor is of an electrically conductive material, such as metal. The conductor can be of expanded metal mesh forming the apertures and conducting portions. Alternatively, the conductor is of perforated metal having a plurality of perforations forming the apertures, wherein the remaining metal form the conducting portions surrounding the apertures. The apertures arranged in displaced rows result in an efficient conductor, which is easy to produce and which can be designed to provide favorable electric properties in an efficient manner to ground pipes or shielded or armored cables. The conductor may be formed from a metal foil or a pliable sheet of metal. The conductor may comprise a regular pattern of apertures.

The sealing module has a longitudinal axis along which the groove extends and along which the cable or pipe is arranged. The sealing module also has a first end and a second end. For example, the sealing module comprises two opposing and separable compressible bodies. The conductor may be arranged between the first and second end of the sealing module or at one or both of said ends. Hence, the conductor may be sandwiched between the compressible body and the cable, wherein the conductor further extends to an outside of the sealing module. Hence, after installation of the sealing module, the conductor is engaging the cable or the shield or armour thereof and is pressed against it. The combination of a compressible body (which is resilient too) and the apertures of the conductor has been found to provide both favorable sealing and grounding properties. The conductor may be flexible so that the conductor adapts to the shape of the cable (or pipe or wire) and the sealing module for the accomplishment of proper abutment and favorable conditions for electrical contact and sealing.

The apertures, or at least some of them, may be elongated. Hence, both the electric and mechanical properties of the conductor can be arranged to be favorable. The apertures may be elongated and orientated in the same direction, such as in a longitudinal direction of the conductor, which is also the desired direction of the conductor for leading current. Hence, efficient conduction in the desired direction is achieved. At the same time, the conductor can be made more flexible in the same direction for improved assembly and sealing properties.

The apertures, or at least some of them, may be formed with two opposite apices, e.g. pointing in the longitudinal direction. It has been found that such a configuration results in favorable properties, such as conductivity in the desired direction and favorable mechanical properties of the conductor. For example, the apertures may have a hexagonal shape, such as a non-regular hexagonal shape due to the elongated configuration. Alternatively, the apertures may have a rhomboid or rhombus shape, which is also called diamond shape, wherein the conductive portions are inclined toward the longitudinal direction of the conductor. Such a configuration guides the electricity in a favorable manner in the desired direction. The conductor may be formed by a strip of expanded metal mesh. The expanded metal mesh may be produced by slitting and stretching a sheet of metal in a conventional manner, optionally including conventional flattening. The expanded metal mesh may have a stretching direction providing the apertures with a shorter dimension in the stretching direction and a longer dimension in a lateral direction perpendicular to the stretching direction, wherein the apertures are separated by the conducting portions. Then, the expanded metal mesh is cut into strips to form the conductor, wherein the conductor is arranged on the compressible body with the longer dimension of the apertures in the longitudinal direction of the conductor. Forming the conductor of an expanded metal mesh provides efficient production and conductivity properties.

A protruding edge may be formed around each of the apertures. The protruding edge may extend substantially perpendicular to a plane of the conductor. The protruding edges may engage the cable or pipe. It has been found that the protruding edges result in favorable properties of the conductor. It is believed that the protruding edges contact and partially enter into the material of the cable or pipe for improved contact. The conductor may also be formed with a protruding edge in the opposite direction for engaging the compressible body for improved fastening thereto.

The conductor may extend in a direction perpendicular to the groove and may extend around the circumference of the compressible body, or a part thereof.

The conductor may alternatively be manufactured by perforating a metal sheet or foil, e.g. using a perforating roller to provide a rolling direction. The rolling direction may correspond to a longitudinal direction of the conductor when the conductor is arranged in the sealing module. Hence, the conductor is manufactured in an efficient manner while providing the desired apertures, such as the desired pattern and shape of the apertures. In addition, the protruding edge around the apertures can be made in an efficient manner.

The apertures may be relatively large. For example, the conducting portions may cover 40 to 90 percent of the conductor area, as seen in a plan view. Hence, efficient electrical and mechanical properties can be achieved while material is saved. Also, the conductor may be provided with a thickness of 0.1-1 mm, which gives good properties in combination with the apertures.

The sealing module may comprise a plurality of peelable sheets allowing the inner diameter of the groove to be adjusted to an outer diameter of the cable or pipe and wherein the conductor is arranged on top of the peelable sheets and is flexible to allow removal of one or more of the peelable sheets. Hence, the conductor can be temporarily moved so as to allow removal of one or more of the peelable sheets if required, wherein the conductor can be put back in place in the groove after removal of the peelable sheet(s). For example, each of the compressible bodies may have one or more stacks of peelable sheets, wherein the one or more stacks of one compressible body correspond to and face the one or more stacks of the other compressible body, and wherein each stack is peelable individually.

The compressible body can comprise a recess for receiving the conductor, wherein the conductor extends to the outside of the sealing module partially inside the recess. Hence, the conductor is at least partially lowered into the recess, enabling the use of a conductor of larger thickness. Hence, the recess will allow for compressible bodies in the form of two module halves to meet even if a relatively thick conductor is sandwiched between them. The recess will also localize the conductor securely in the sealing module. The recess may extend from the groove to the outer surface and optionally further along the exterior of the compressible body. The width of the recess may correspond to the width of the conductor, and the depth of the recess may correspond to the full thickness of the conductor or a part of the thickness of the conductor. The recess will position the conductor while preventing it from interfering with the sealing abilities of the sealing module.

The present invention is also related to a transit system comprising a frame, at least one sealing module of the present disclosure arranged within the frame, and a compression unit for compression of the sealing module within the frame, wherein the frame is of a conducting material and wherein the conductor is in electric contact with the frame. The conductor may be in direct contact with the frame or may be arranged in contact with the frame through an adjacent sealing module with conductor. The conductor may be in electric connection with the frame through a stayplate of conductive material, if applicable. Alternatively, the transit system may be a round seal for one cable or a plurality of cables.

The present invention is also related to a method of manufacturing the sealing module, wherein the conductor is formed by slitting a sheet of metal and stretching said sheet into an expanded metal mesh, and arranging the conductor on the compressible body. Said method may also include the step of stretching the sheet in a stretching direction and arranging the expanded metal mesh with the stretching direction perpendicular to the longitudinal direction of the conductor. Said method may also include the step of arranging two compressible bodies with the grooves facing each other and with the conductor between them. Said method may also include the step of forming the compressible bodies by extrusion.

The present invention is also related to a method of manufacturing the sealing module, wherein the apertures of the conductor are formed by a perforating roller in a rolling direction, and the conductor is arranged in the sealing module such that the rolling direction corresponds to a longitudinal direction of the conductor.

The present invention is also related to the use of expanded or perforated metal as a conductor in a sealing module, wherein the sealing module comprises a compressible module comprising an outer surface and a groove for receiving a cable or a pipe, wherein the conductor is arranged to extend from the groove to the outer surface such that the conductor electrically contacts the cable or pipe received in the groove and forms a conductive path to the outer surface.

Further objects and advantages of the present invention will be clear to a person skilled in the art when reading the detailed description below.

DESCRIPTION OF EMBODIMENTS

To further describe the present invention a number of embodiments thereof will be described in detail below, referring to the appended drawings. The description of embodiments is directed towards cables, yet it should be noted that the present invention may also be used for pipes for grounding and bonding thereof.

Figure 1:
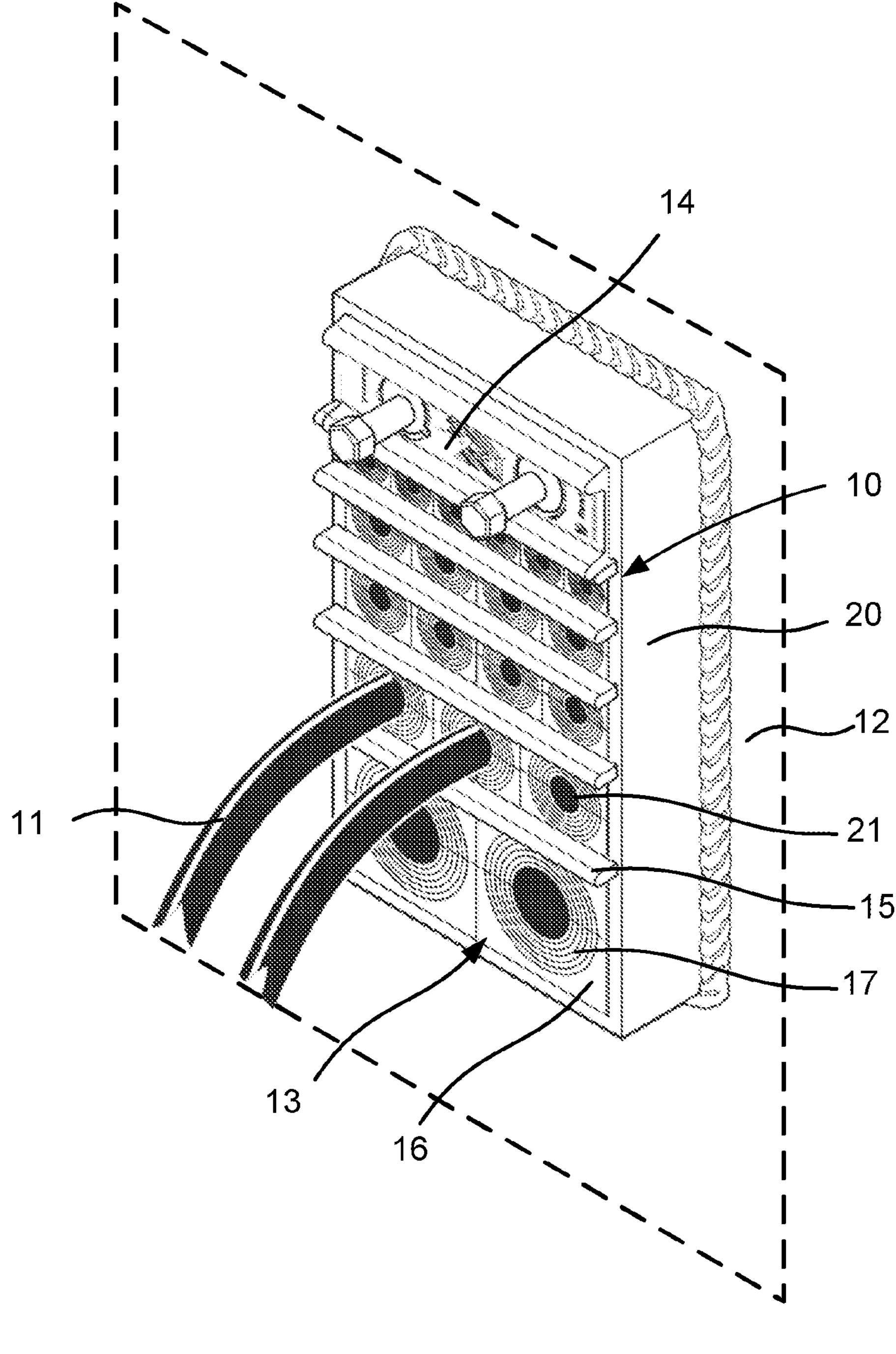
FIG. 1 is a schematic perspective view of a transit system according to one embodiment, which transit system is arranged in a partition in the form of a wall and provided with compressible sealing modules, stayplates and a compression unit.

With reference to FIG. 1, a transit system 10 for passing at least one cable 11 and/or at least one pipe through a partition 12 is illustrated schematically according to one embodiment. The transit system 10 is arranged for passing one or more cables 11 and/or pipes through a partition 12, e.g. in the form of a wall, a floor, a roof or a ceiling. The partition 12 is illustrated by means of dashed lines in FIG. 1. For example, the transit system 10 is arranged for passing cables 11, such as cables for electricity, communication, computers etc., or pipes for different gases or liquids, such as water, compressed air, hydraulic fluid, cooking gas or other types of liquids or gases. Cables and/or pipes are led in an axial direction through the transit system 10.

The transit system 10 according to FIG. 1 is arranged for receiving one or more sealing modules 13, a compression unit 14 and optionally stayplates 15. The sealing modules 13 may be arranged in different sizes and a plurality of different sealing modules 13 may be arranged in different configurations. For example, the compression unit 14 and the stayplates 15, if applicable, are of conventional type. For example, the compression unit 14 is a conventional wedge.

Figure 2:
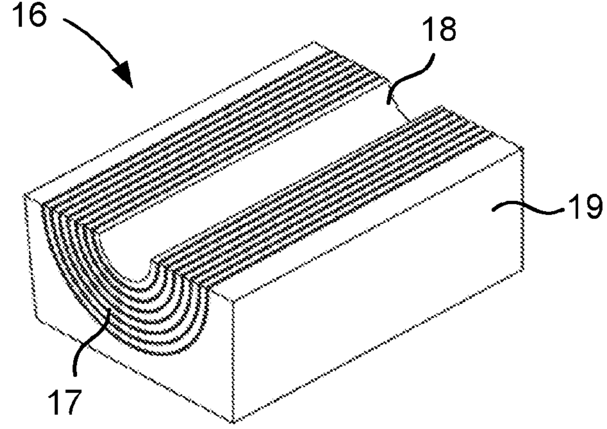
FIG. 2 is a schematic perspective view of a compressible body in the form of a conventional sealing module half of a sealing module, illustrating the general concept of a groove and peelebale sheets thereof.

The sealing modules 13 are compressible. For example, the sealing modules 13 are resilient and comprises two opposite and compressible bodies 16 in the form of sealing module halves, wherein the compressible body 16 is a compressible sealing module half. Optionally, each compressible body 16 comprises a plurality of peelable sheets 17 placed in a semi-cylindrical groove 18 as illustrated in FIG. 2. For example, each compressible body 16 has its own stack of semi-cylindrical peelable sheets 17. For example, the peelable sheets 17 as such are of conventional type and are provided to adapt the diameter of the groove 18 to the outer diameter of the cable 11 or pipe. Optionally, a suitable number of peelable sheets 17 are removed to adapt the sealing module 16 to the diameter of the cable 11 or pipe, wherein the cable 11 or pipe is placed in the compressible body 16 and a sealing module 13 is formed by placing two module halves 16 on top of each other so that the grooves 18 are facing each other and form an opening for the cable 11 or pipe. The compressible body 16 also comprises an outer surface 19. The sealing modules 13 are resilient, and a suitable material may be natural or synthetic rubber, such as an EPDM rubber, optionally with additional fillers, but other alternatives are possible, such as TPE.

In the embodiment of FIG. 1, the transit system 10 comprises a frame 20, wherein the one or more sealing modules 13 are arranged within the frame 20, optionally together with one or more stayplates 15 and the compression unit 14. For example, the frame 20 is of a conductive material, such as metal. For example, the frame 20 is of conventional type. A blind 21, such as a rubber or plastic core, may be arranged in the opening formed by the grooves 18 to provide sealing if a cable is not arranged. The blind 21 is removed prior to the arrangement of a cable therein. For example, the blind 21 is of conventional type.

Figure 3:
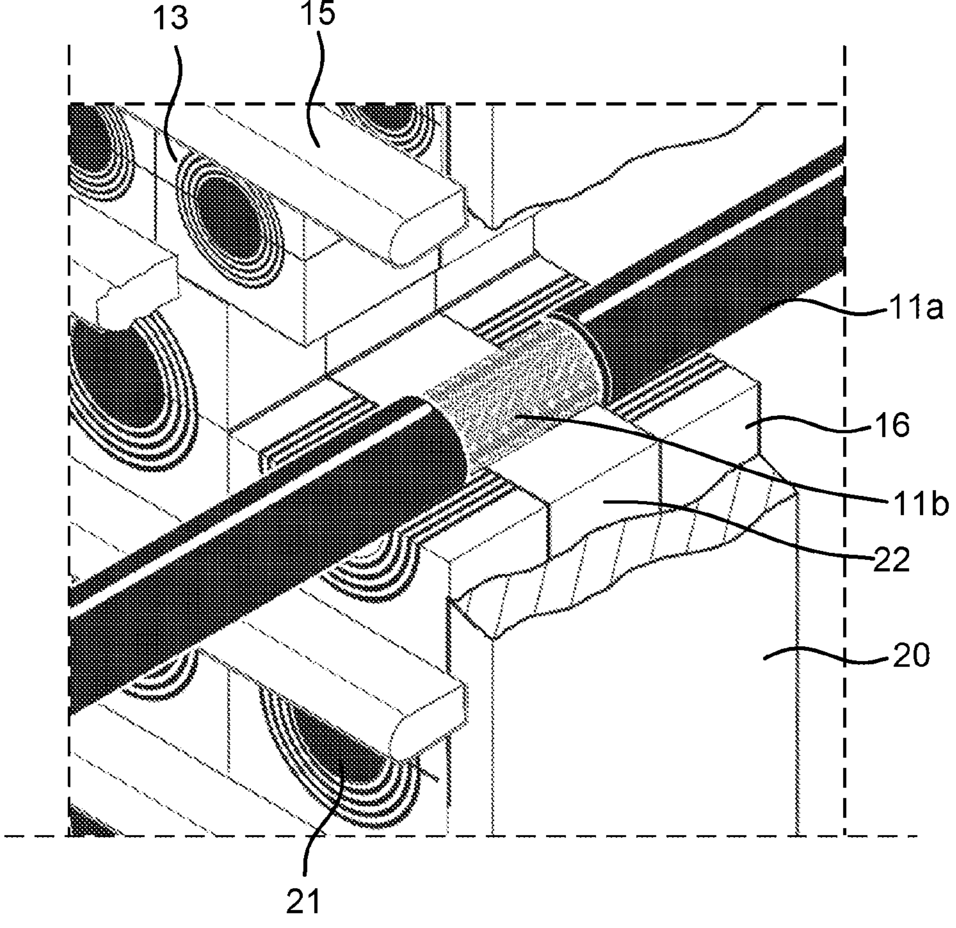
FIG. 3 is a schematic perspective view of a part of the transit system of FIG. 1 according to one example, illustrating a conductor of a compressible body in contact with a cable shield of a cable arranged through the transit system.

With reference also to FIG. 3 a part of the transit system 10 is illustrated schematically, wherein a part has been taken away to illustrate the cable 11 arranged through a sealing module 13. As can be seen in FIG. 3, the sealing module 13 comprises a conductor 22, which will be described more in detail below. The conductor 22 is arranged to ground the cable 11 arranged in the groove 18. For example, a cable jacket 11*a* is removed in a portion of the cable 11 to expose a cable shield 11*b*, wherein the cable shield 11*b* is arranged in contact with the conductor 22. The frame 20 is, e.g. of a conductive material, such as metal, wherein the conductor 22 is arranged in electric contact with the frame 20, either directly or via a stayplate 15 of conductive material or via conductors 22 of adjacent sealing modules 13 or via other electrical connection, for grounding the cable 11. For example, a current is diverted through the conductor 22 to the frame 20. For example, current, if any, is diverted through the conductor 22 via a stayplate 15 or an adjacent sealing module 13 with conductor 22 to the frame 20. The frame 20 will act as a collecting bar which in turn is connected to ground. It should be noted that not all sealing modules 13 in the frame 20 must be provided with the conductor 22. For example, in the transit system the current may travel along several routes to reach ground, and the internal resistance for the system is low.

Figure 4:
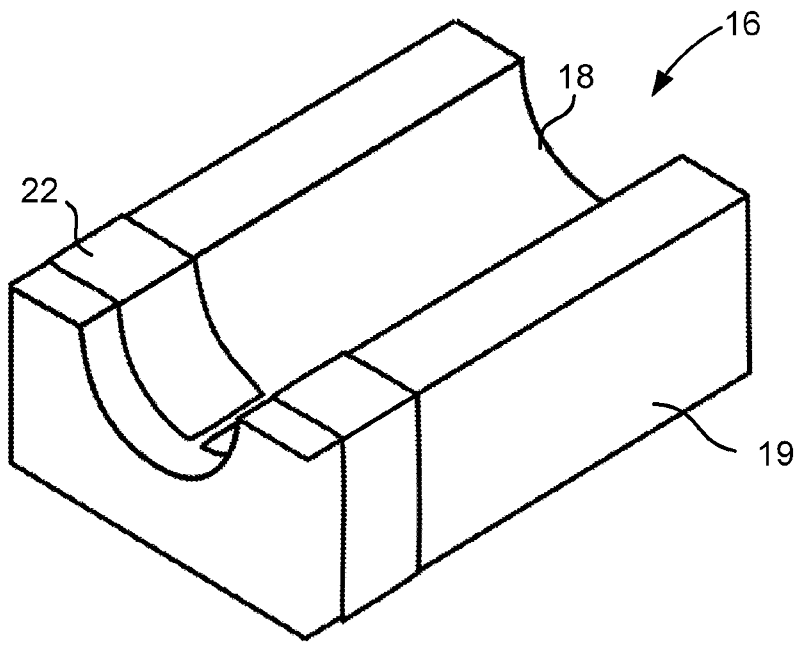
FIG. 4 is a schematic perspective view of the compressible body with a conductor in accordance with another embodiment of the present invention.
Figure 5:
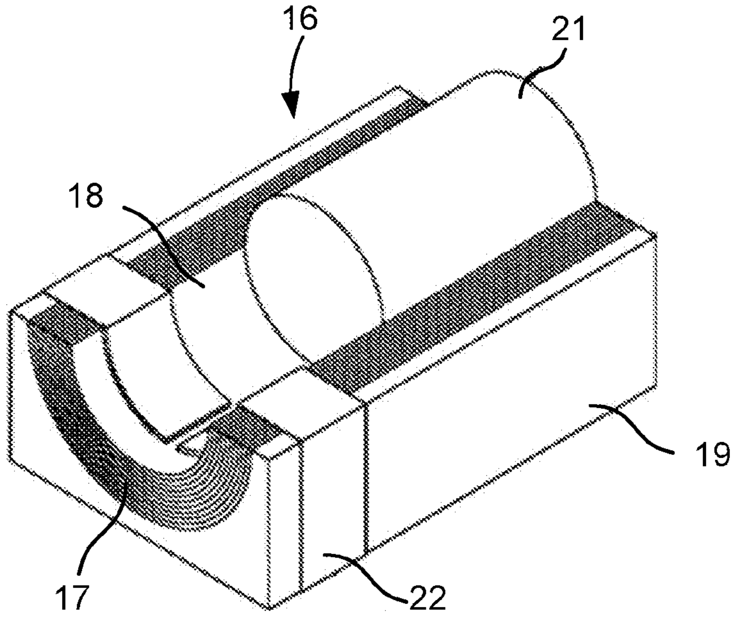
FIG. 5 is a schematic perspective view of the compressible body in accordance with another embodiment, wherein the compressible body is provided with the peelable sheets and the conductor.
Figure 6:
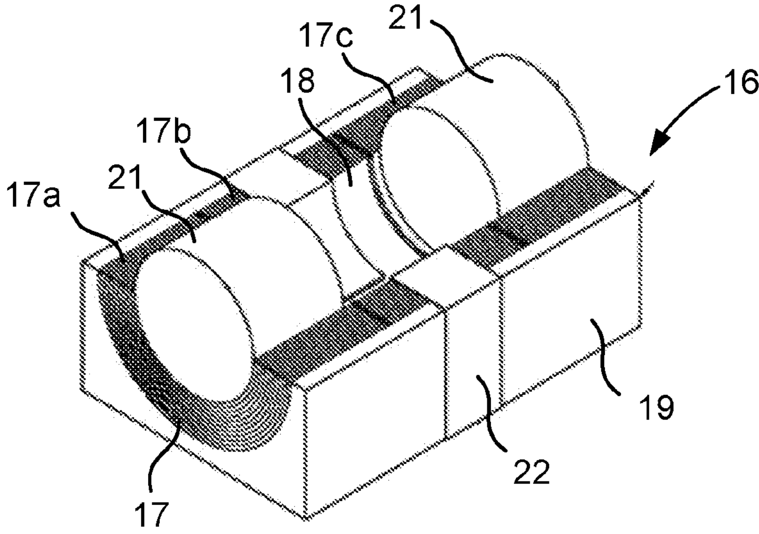
FIG. 6 is a schematic perspective view of the compressible body with the conductor and blinds in accordance with yet another embodiment, wherein the peelable sheets are arranged in individual stacks.

With reference to FIGS. 4-6 a compressible body 16 of the sealing module 13 is illustrated according to different embodiments, wherein the compressible body 16 in FIGS. 5 and 6 comprises the peelable sheets 17. The compressible body 16 is provided with the conductor 22. In FIGS. 4 and 5, the compressible body 16 is formed as a sealing module half, wherein the sealing module 13 comprises two compressible bodies 16, such as two identical compressible bodies 16 or one compressible body 16 having the conductor and another compressible body 16 without a conductor 22. Hence, at least one of the compressible bodies 16 of a sealing module 13 comprises the conductor 22.

It is seen how the compressible body 16 has the axial, semicircular groove 18 extending from a first end to a second end of the compressible body 16, and that the peelable sheets 17 of material are arranged in the groove 18 in FIGS. 5 and 6. In the embodiment of FIGS. 5 and 6, the blind 21 does not extend the full length of the compressible body 16, and in particular it does not extend over the portion where the conductor 22 is arranged. The blind 21 may in one or more embodiments be provided with a cut-out portion for the conductor 22, as illustrated in FIG. 6.

The compressible body 16 has an outer surface 19 as mentioned above. The conductor 22 extends from the groove 18 to the outer surface 19. According to the illustrated embodiments, the conductor 22 extends orthogonal to the axial groove 18 of the compressible body 16, generally along an inner circumference of the groove 18 and the peelable sheets 17 arranged therein. For example, the conductor 22 extends in a cross direction of the compressible body 16 and the sealing module 13, such as from an approximate middle of the groove 18, to the outer surface 19, around the outer circumference of the compressible body 16, to the approximate middle of the groove 18, such that the first end of said length faces the second end and such that the conductor 22 connects an "inside" of the sealing module 13 (which normally is not accessible during use) to an outside, which may be accessible during use, or at least may be in contact with surrounding equipment, such as the frame 20, stayplate 15, a wire or similar for grounding. For example, the conductor 22 is provided with a gap in the groove 18, e.g. to facilitate temporary removal of the conductor 22 for allowing peeling of sheets 17. Alternatively, the conductor 22 extends around the entire circumference of the compressible body 16. Alternatively, the conductor 22 extends around the entire circumference of the compressible body 16, wherein the ends of the conductor 22 overlap. Hence, the conductor 22 extends at least from the groove 18 to be in contact with the cable 11 or pipe therein to the outer surface 19 of the compressible body 16 for further connection to ground, such that the conductor 22 electrically contacts the cable 11 or pipe received in the groove 18 and forms a conductive path to the outer surface 19.

In use for a cable 11, an outer jacket of a shielded cable 11 is stripped in a small segment thereof such as to expose the cable screen (or shield or armor, whichever is applicable) in that segment (as illustrated in FIG. 3). The cable 11 is then arranged in the sealing module 13 such that the conductor 22 abuts the stripped segment, providing an adequate electrical connection. As the sealing module 13 is compressed the conductor 22 will be forced towards the cable shield. The peelable sheets 17 may be arranged in stacks, such as a first end stack 17*a*, a middle stack 17*b* and a second end stack 17*c*, which is illustrated in FIG. 6, wherein an effective diameter of the groove 18 may be varied along the groove 18. For example, the peelable sheets 17 are arranged in two or three stacks displaced in the axial direction or arranged next to each other in the axial direction, so that the diameter of the groove 18 can be adapted individually in different sections thereof, such as to the reduced diameter where the outer jacket of the cable 11 has been removed. The number of peelable sheets 17 to be removed may differ between the stacks. Hence, the diameter of the groove 18 in every stack 17*a-c* of peelable sheets 17 is individually adjustable.

Figure 7:
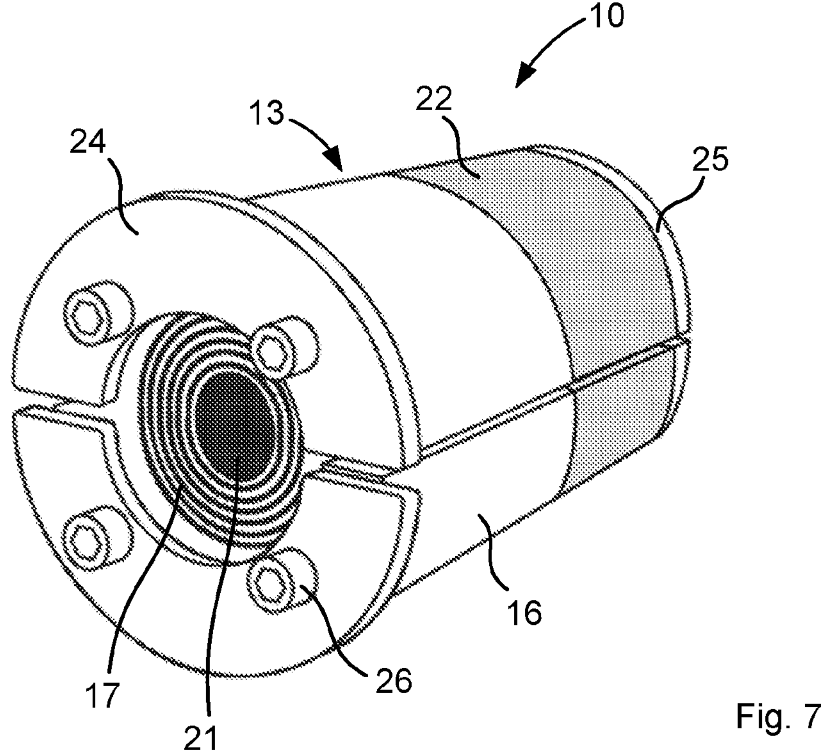
FIG. 7 is a schematic perspective view of a transit system in accordance with another embodiment of the present invention.

The sealing module may be of parallelepiped shape (or block shape) or cylindrical shape, yet other shapes are foreseeable within the scope of the present invention as defined by the claims. In the embodiments of FIGS. 1-6, the sealing module 13 formed by the compressible bodies 16 has a parallelepiped outer shape. However, other shapes are foreseeable within the scope of the present invention as defined by the claims. With reference to FIG. 7 the transit system 10 according to another embodiment is illustrated schematically, wherein the sealing module 13 has a cylindrical outer shape and is formed of two semicylindrical or semiannular compressible bodies 16 with optional peelable sheets 17 to form a round seal for a single cable. Alternatively, a plurality of sealing modules 13 having a shape as described with reference to FIGS. 1-6 is arranged within a rectangular opening of the round seal. In the embodiment of FIG. 7, both of the compressible bodies 16 are provided with the conductor 22. The sealing module 13 of FIG. 7 is similar to the sealing module 13 already described above with reference to FIGS. 1-6, apart from the cylindrical shape. The compression unit of the transit system of FIG. 7 is formed by front and rear fittings 24, 25 connected by screws 26 for compressing the sealing module 13 in the axial direction. The transit system 10 of FIG. 7 is, e.g. positioned in a sleeve or in an opening in the partition 12.

Figure 8:
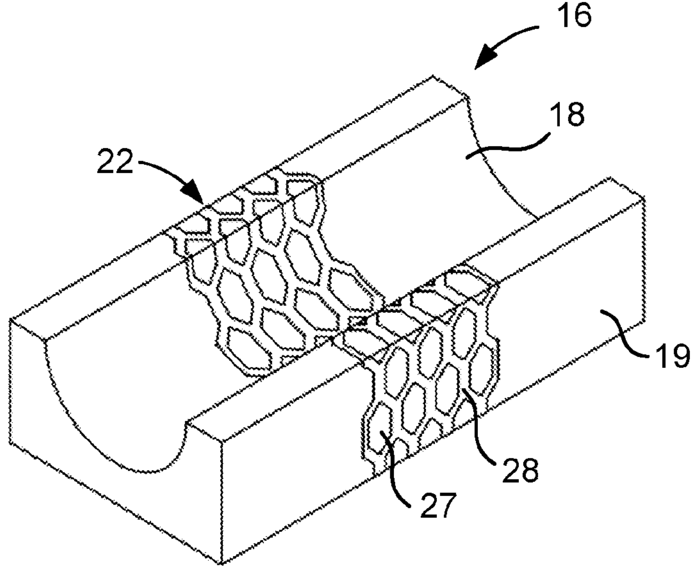
FIG. 8 is a schematic perspective view of a compressible body with the conductor, illustrating apertures of the conductor according to one embodiment of the present invention.
Figure 9:
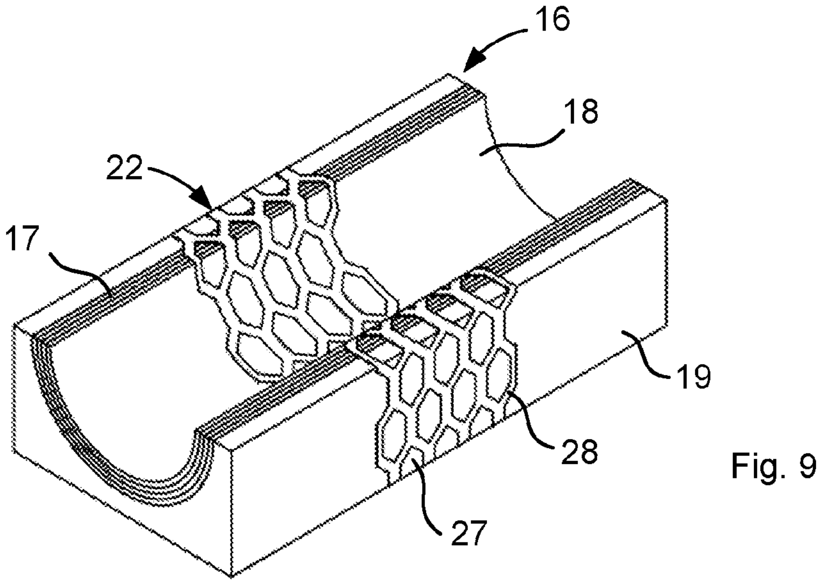
FIG. 9 is a schematic perspective view of a compressible body with peelable sheets and the conductor according to FIG. 8.

With reference to FIGS. 8 and 9 the compressible body 16 with the conductor 22 is illustrated schematically according to one embodiment of the invention. According to the present invention, the conductor 22 comprises a plurality of through apertures 27 and conducting portions 28 surrounding the apertures 27. The apertures 27 and conducting portions 28 have been enlarged in the drawings for clarity purposes. Hence, in practice, the apertures 27 and conductive portions 28 can be much smaller. The conductor 22 is of metal, such as copper or other suitable electrically conducting material, including suitable conductive alloys. For example, the conductor 22 is an expanded metal mesh or a perforated sheet or foil of metal. The apertures 27 are through openings substantially perpendicular to a plane of the conductor 22 or a plane of the sheet or foil of metal forming the conductor 22. For example, the conducting portions 28 are the remaining material of the sheet or foil of metal after slitting and stretching thereof or after perforation thereof. For example, the conductor 22 has a thickness of 0.1-1 mm or 0.1-0.5 mm, such as 0.15-0.35 mm. For example, the conductor 22 is pliable and flexible so that it can be bent, e.g. by hand, around the compressible body 16. For example, all apertures 27 are of similar shape and arranged in the same configuration. Alternatively, the apertures have different shapes and/or are arranged in different configurations.

The apertures 27 are arranged in rows along the conductor 22. For example, the apertures 27 are also arranged in rows perpendicular to the longitudinal direction of the conductor 22. The apertures 27 are displaced in the longitudinal direction in relation to apertures of adjacent rows. The apertures 27 are, for example, arranged in a regular pattern. For example, the rows of apertures 27 may be in parallel to each other. Hence, the conducting portions 28 are also arranged in a regular pattern. In the illustrated embodiment, the apertures 27 are elongated resulting in different electrical and mechanical properties depending on the direction of the apertures 27. The apertures 27 and conducting portions 28 are arranged to promote conductance of current in the direction of the conductor 22. For example, some or all of the apertures 27 are elongated and some or all of the elongated apertures are arranged in the same direction to promote conductance in that direction. For example, at least some of the conducting portions 28 are elongated and extend in the longitudinal direction of the conductor 22 or are inclined in relation to the longitudinal direction of the conductor 22. Except from an edge of the conductor 22, each of the conducting portions 28 separate adjacent apertures 27. For example, the conducting portions 28 are alternatingly inclined toward and away from a longitudinal axis of the conductor 22. For example, the conducting portions 28 extending away from the longitudinal axis do so in an acute angle and the conducting portions 28 extending toward the longitudinal axis do so in an acute angle in relation to it. For example, each end of the conducting portions 28 connect to both a longitudinally adjacent and laterally adjacent conducting portion. In the embodiment of FIGS. 8 and 9 the apertures 27 and conducting portions 28 are arranged to promote conductance of current in a direction perpendicular to the axial direction of the sealing module 13 and perpendicular to the groove 18. Hence, the elongated apertures 27 are arranged in the direction of the conductor 22, i.e. the longitudinal direction of the conductor 22 and in the direction current is to be conducted. The elongated apertures 27 have a longitudinal axis, which extends in the longitudinal direction of the conductor 22 and from the groove 18 to the outer surface 19 of the compressible body 16. The configuration of the apertures 27 and the conducting portions 28 may be arranged to provide a bigger conductive area in the longitudinal direction than in the transverse direction of the conductor 22. For example, the configuration of the apertures 27 and the conducting portions 28 is arranged to provide a shorter effective path for the current in the longitudinal direction than in the transverse direction of the conductor 22 to promote conductance in the longitudinal direction. The elongated apertures 27 is, for example, oval, triangular, rectangular or polygonal. For example, the elongated apertures 27 have an apex or two opposite apices pointing in the longitudinal direction of the conductor 22. In the embodiments of FIGS. 8 and 9, the apertures 27 are hexagonal with an elongated shape having a longitudinal axis and two opposite apices arranged in the longitudinal direction of the conductor 22, and in the embodiment of FIGS. 8 and 9, perpendicular to the groove 18. The apertures 27 are, e.g. arranged with two opposite and parallel edges extending in the longitudinal direction of the conductor 22. Alternatively, the apertures 27 are circular, square or arranged with another suitable shape.

According to the embodiments illustrated in FIGS. 8 and 9 the apertures 27 are distributed to promote conductance in the longitudinal direction of the conductor 22. Hence, the apertures 27 are distributed to form conducting portions 28 having a more effective path in the longitudinal direction than in the transverse direction of the conductor 22, such as a straighter and more effective path in the longitudinal direction. For example, apertures 27 are displaced in relation to each other in the longitudinal and/or transverse direction of the conductor 22. In the illustrated embodiment, the apertures 27 are arranged in transverse rows, wherein the next row is displaced in the transverse direction. In the illustrated embodiment, the apertures 27 are also arranged in longitudinal rows, wherein the next row is displaced in the longitudinal direction. For example, the rows of apertures 27 are alternatingly displaced. In addition, the rows of apertures 27 overlap each other, wherein the apertures 27 of one row extend into a position between apertures 27 of the adjacent row. For the elongated hexagonal apertures 27 illustrated in FIGS. 8 and 9 the conductive portions 28 are arranged in a stretched honeycomb pattern. For example, the conductive portions 28 include longitudinal conductive portions and inclined conductive portions, wherein the longitudinal conductive portions extend in the longitudinal direction of the conductor 22 and are connected to each other through the inclined conductive portions. For example, the inclined conductive portions are arranged in an angle of 40 to 70 degrees in relation to the longitudinal conductive portions. For example, the longitudinal conductive portions are longer than the inclined conductive portions. Alternatively, the apertures 27 are oval or parallelogram-shaped, such as elongated rhomboid, and arranged in a corresponding pattern. In the case of parallelogram-shaped apertures 27 there may be only inclined conductive portions, e.g. extending in an angle of 40 to 70 degrees in relation to the longitudinal direction of the conductor 22. For example, the conducting portions 28 cover 40 to 90 percent of the conductor 22 area, as seen in a plan view.

Figure 10:
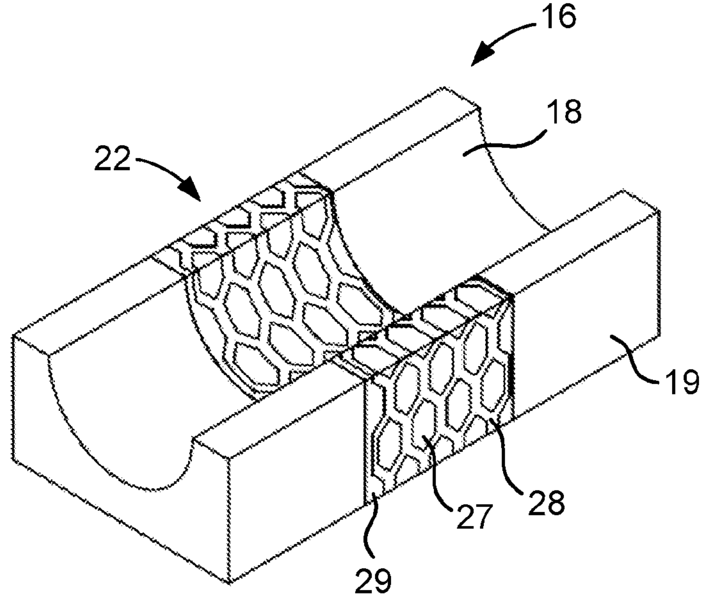
FIG. 10 is a schematic perspective view of a compressible body with the conductor of FIGS. 8 and 9, wherein the conductor is arranged in a recess of the compressible body.

With reference to FIG. 10, the compressible body 16 is illustrated according to another embodiment, wherein the compressible body 16 is formed with a recess 29 for receiving the conductor 22. Hence, the conductor 22 is arranged entirely within or at least partly within the recess 29. The depth of the recess is, e.g. slightly less than the thickness of the conductor 22. Alternatively, the depth of the recess 29 corresponds to the thickness of the conductor 22. The recess 29 may be machined or molded during manufacture of the compressible body 16. In the illustrated embodiments, the recess 29 is arranged in a midsection of the compressible body 16. Alternatively, the recess 29 is arranged at an end section of the compressible body 16. The recess 29 extends along the circumference of the compressible body 16. For example, the recess 29 extends at least from the groove 18 to the outer surface 19 and/or at least along the outer surface 19 in a direction perpendicular to the groove 18. In the embodiment of FIG. 10 the recess 29 may also extend across the groove 18. For example, the recess 29 extends continuously around the entire circumference of the compressible body 16.

Figure 11:
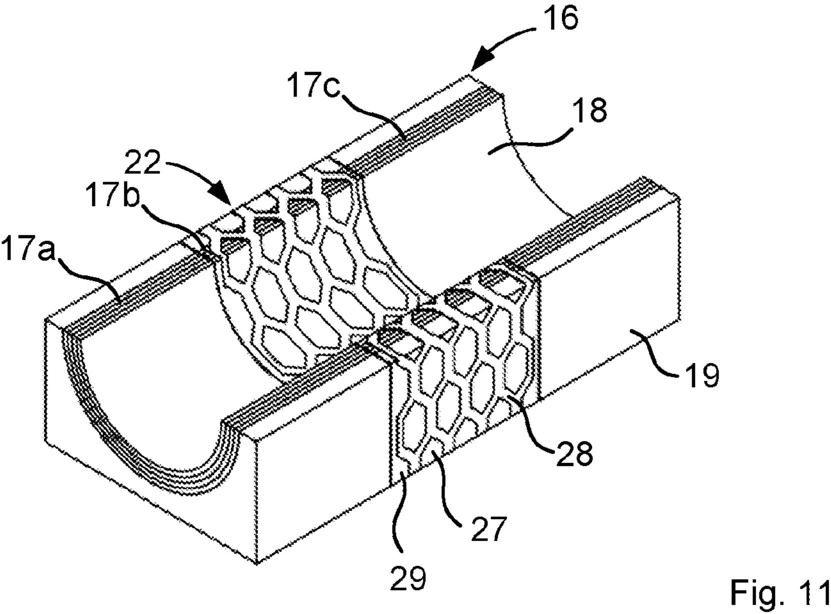
FIG. 11 is a schematic perspective view of a compressible body according to yet another embodiment, wherein the conductor is arranged in the recess and the compressible body is provided with a plurality of stacks of peelable sheets.

With reference to FIG. 11 the compressible body 16 is formed with the recess 29 as described with reference to FIG. 10. In addition, the compressible body according to FIG. 11 is provided with the peelable layers 17 arranged in stacks 17*a-c* as described above with reference to FIG. 6. Hence, the peelable sheets 17 are arranged peelable in individual stacks 17*a*-17*c*, wherein each stack comprises a plurality of peelable sheets 17, so that the diameter of the groove 18 can be varied individually for different sections thereof. For example, the diameter of the groove 18 in a middle section can be adapted to a cable 11 with its cable jacket removed, wherein first and second end sections of the groove 18 can be adapted for the cable 11 with the jacket. Hence, the middle section of the groove 18 comprises the middle stack 17*b* of peelable sheets 17, which can be arranged for receiving a cable 11 with smaller diameter than the end sections of the groove 18 with the first and second end stacks 17*a*, 17*c* of peelable sheets. For example, each compressible body 16 comprises exactly three sections 17*a-c* of peelable sheets. For example, the recess 29 extends from the groove 18 section corresponding to the middle stack 17*b* of peelable sheets and continuously around the circumference of the compressible body 16 to the opposite side of said groove 18 section.

Figure 12:
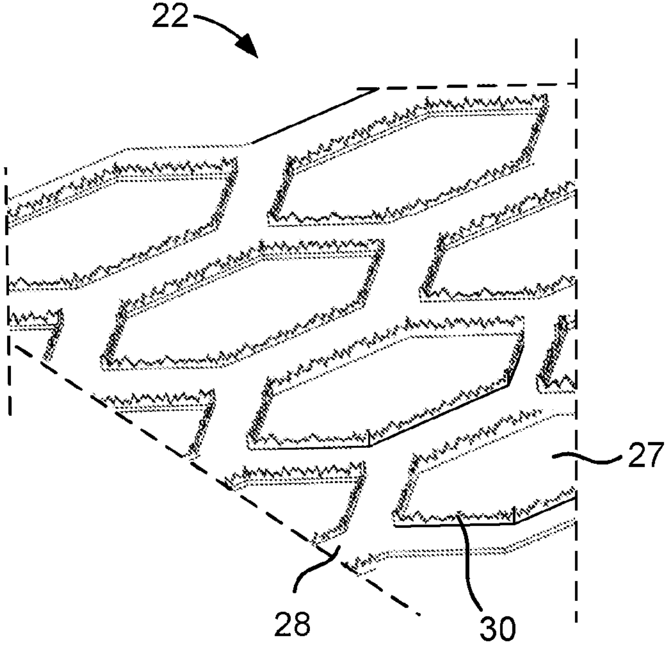
FIG. 12 is a schematic perspective view of a part of the conductor according to one embodiment, illustrating a protruding edge around the apertures.

With reference to FIG. 12, the conductor 22 comprises a protruding edge 30 arranged around the apertures 27. Hence, the conductive portions 28 are formed with the protruding edge 30 partially or entirely around the apertures 27, e.g. by means of the perforation process for forming the apertures 27. The protruding edge 30 extends substantially perpendicular to a plane of the conductor 22. For example, the protruding edges 30 extend in a radial direction away from the compressible body 16 and may provide a plurality of effective contact points for engaging the cable 11. It may be that the protruding edges 30 partially extend into the cable 11, such as the cable shield thereof. The protruding edge 30 may be uneven and may comprise a plurality of elevations, such as the pointed tops illustrated in FIG. 12. Alternatively, an edge protruding in one direction or opposite directions substantially perpendicular to the plane of the conductor 22 is formed by a process for forming expanded metal mesh.

Figure 13:
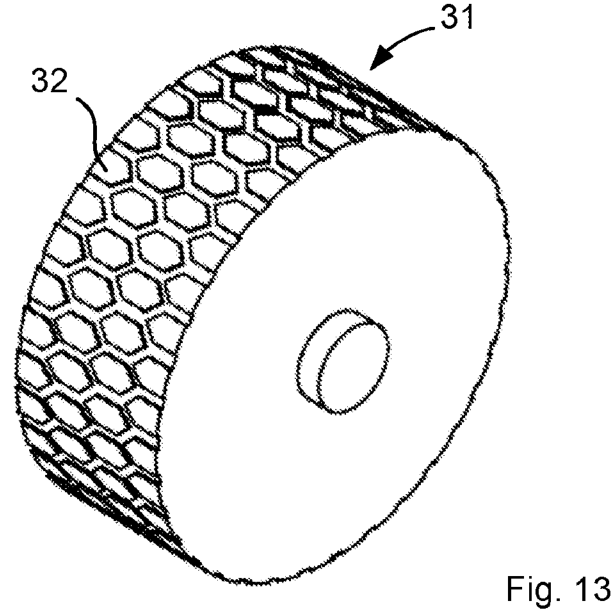
FIG. 13 is a schematic perspective view of a perforation roller for manufacturing the conductor according to one embodiment.

With reference to FIG. 13, a perforating roller 31 for forming the conductor 22 according to FIGS. 8-12 is illustrated schematically. The perforating roller 31 comprises a plurality of protrusions 32 for forming the apertures 27 of the conductor 22. Hence, basically the shape of the protrusions 32 corresponds to the shape of the apertures 27. As for the apertures 27 of the conductor 22, the protrusions 32 of the perforating roller 31 are enlarged for clarity and may in practice be much smaller. According to one embodiment, the conductor 22 is manufactured by perforating the metal sheet or foil using the perforating roller 31. For example, the metal sheet or foil is perforated and then cut into suitable strips to form the conductor 22. Alternatively, a strip of metal is perforated, which perforated strip is then cut into suitable length to form the conductor 22. The perforating roller 31 has a rolling direction. For example, the rolling direction of the perforating roller 31 corresponds to the transverse direction of the conductor 22 when it is arranged on the compressible body 16. In the illustrated embodiment, the protrusions 32, or at least some of them, are elongated to form the elongated apertures 27 as described above. Hence, the protrusions 32 are oval, rectangular, triangular or polygonal, such as elongated hexagonal, as described above for the apertures 27, and have a longitudinal axis. The longitudinal axis of the protrusions 32 extend in a direction perpendicular to the rolling direction, i.e. perpendicular to the outer circumference of the perforating roller 31.

Figure 14:
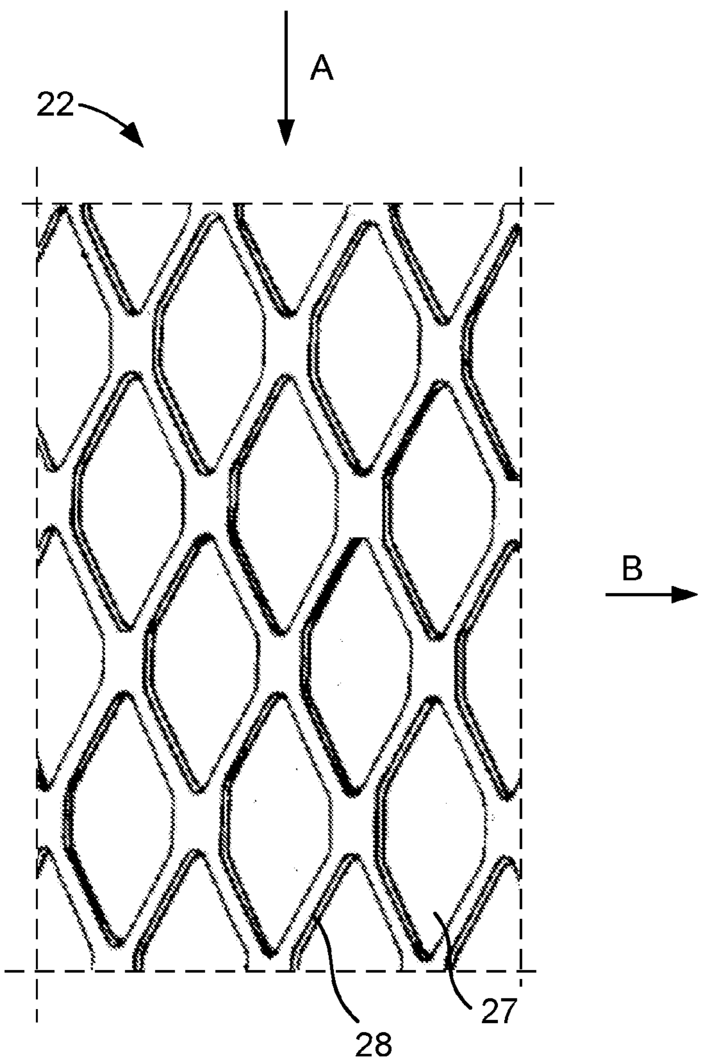
FIG. 14 is a schematic view of a portion of the conductor according to one embodiment, wherein the conductor is formed of expanded metal mesh and wherein a stretching direction for producing the expanded metal mesh is illustrated in relation to a longitudinal direction of the conductor.

With reference to FIG. 14 a portion of the conductor 22 according to one embodiment is illustrated schematically, wherein the conductor 22 is formed by an expanded metal mesh to provide the apertures 27 and the conducting portions 28 surrounding the apertures 27. The apertures 27 are arranged in rows as described above. The apertures 27 are, e.g. hexagonal or rhomboid, which also is referred to as diamond shape. The conducting portions 28, or at least some of them, are elongated and at least partially inclined towards the longitudinal direction of the conductor 22. The longitudinal direction of the conductor 22 is illustrated by means of the arrow A in FIG. 14. The expanded metal mesh may be produced in a conventional manner, including the steps of slitting and stretching a sheet of metal and optionally also including the step of flattening. A stretching direction for producing the expanded metal mesh is illustrated in FIG. 14 by means of the arrow B. For example, the stretching direction B is perpendicular to the longitudinal direction A of the conductor 22. The apertures 27 in the embodiment of FIG. 14 are elongated and arranged in the longitudinal direction, so that a long dimension of the aperture 27 extend in the longitudinal direction of the conductor 22. For example, opposite apices of the apertures 27 are arranged in the longitudinal direction of the conductor 22.

The invention claimed is:

1. A sealing module for a cable or a pipe, comprising at least one compressible body and a conductor, wherein the compressible body comprises an outer surface and a groove for receiving the cable or pipe, and wherein the conductor is arranged to extend from the groove to the outer surface, such that the conductor electrically contacts the cable or pipe received in the groove and forms a conductive path to the outer surface, wherein the conductor comprises a plurality of through apertures and conducting portions surrounding the apertures, wherein the apertures are arranged in longitudinal rows along the conductor, wherein the apertures are displaced in the longitudinal direction in relation to the apertures of adjacent rows of apertures, wherein the conductor is formed by a strip of expanded metal mesh, and wherein the strip of expanded metal mesh comprises a slit and stretched sheet of metal having the apertures separated by the conducting portions.

2. The sealing module according to claim 1, wherein the conductor comprises a regular pattern of apertures and conducting portions.

3. The sealing module according to claim 1, wherein at least some of the apertures are elongated.

4. The sealing module according to claim 1, wherein at least some of the apertures are orientated in the same direction.

5. The sealing module according to claim 1, wherein at least some of the apertures are orientated in a longitudinal direction of the conductor.

6. The sealing module according to claim 1, wherein at least some of the apertures are formed with two opposite apices in the longitudinal direction of the conductor.

7. The sealing module according to claim 1, wherein at least some of the apertures are hexagonal, rhomboid or rhombus.

8. The sealing module according to claim 1, wherein the conductive portions are inclined toward the longitudinal direction of the conductor.

9. The sealing module according to claim 1, wherein the conductive portions are formed with a protruding edge around the apertures.

10. The sealing module according to claim 1, wherein the conductor extends in a direction perpendicular to the groove.

11. The sealing module according to claim 10, wherein the sealing module comprises two opposite compressible bodies and wherein the conductor extends around a circumference of at least one of the compressible bodies.

12. A transit system comprising a frame, at least one sealing module according to claim 1 arranged within the frame, and a compression unit for compression of the sealing module within the frame, wherein the frame is of a conducting material and wherein the conductor is in electric contact with the frame.

13. The transit system of claim 12, further comprising a plurality of sealing modules and at least one stayplate of a conducting material arranged between sealing modules and in contact with the frame, wherein the stayplate is arranged in contact with the conductor.

14. A method of manufacturing the sealing module according claim 1, wherein the conductor is formed by slitting a sheet of metal and stretching said sheet into an expanded metal mesh, and arranging the conductor on the compressible body.

* * * * *